US010989582B2

United States Patent
Laun

(10) Patent No.: US 10,989,582 B2
(45) Date of Patent: Apr. 27, 2021

(54) METHOD FOR DETERMINING AND DISPLAYING REMAINING FILLING OR DRAINING TIME

(71) Applicant: VEGA GRIESHABER KG, Wolfach (DE)

(72) Inventor: Robert Laun, Hausach (DE)

(73) Assignee: VEGA GRIESHABER KG, Wolfach (DE)

( * ) Notice: Subject to any disclaimer, the term of this patent is extended or adjusted under 35 U.S.C. 154(b) by 0 days.

(21) Appl. No.: 16/190,812

(22) Filed: Nov. 14, 2018

(65) Prior Publication Data

US 2019/0250023 A1 Aug. 15, 2019

(30) Foreign Application Priority Data

Jan. 26, 2018 (EP) .................................... 18153623

(51) Int. Cl.
*G01F 23/00* (2006.01)
*G01F 23/284* (2006.01)

(52) U.S. Cl.
CPC .......... *G01F 23/0061* (2013.01); *G01F 23/00* (2013.01); *G01F 23/284* (2013.01)

(58) Field of Classification Search
CPC combination set(s) only.
See application file for complete search history.

(56) References Cited

U.S. PATENT DOCUMENTS

| 4,091,385 A * | 5/1978 | Petlevich | G01F 1/663 342/115 |
| 5,285,545 A * | 2/1994 | Payne | D06F 39/005 68/12.05 |
| 5,439,019 A * | 8/1995 | Quandt | D06F 39/088 137/2 |
| 5,550,531 A * | 8/1996 | Little-Lowry | B63C 9/0005 116/173 |
| 2002/0144536 A1* | 10/2002 | Sullivan | G01N 33/34 73/19.05 |
| 2007/0100575 A1* | 5/2007 | Young | G01F 1/662 702/128 |
| 2015/0007655 A1* | 1/2015 | Skowaisa | G01F 1/663 73/198 |

(Continued)

FOREIGN PATENT DOCUMENTS

DE 19855377 A1 12/1998
DE 10 2016 120 048 A1 4/2017

(Continued)

OTHER PUBLICATIONS

Cooper et al., Using FMCW Doppler Radar to Detect Targets up to the maximum Unambiguous Range, Mar. 2017, IEEE Geoscience and Remote Sensing Letters, vol. 14, No. 3., pp. 339-343. (Year: 2017).*

(Continued)

*Primary Examiner* — Nabil H Syed
*Assistant Examiner* — Cal J Eustaquio
(74) *Attorney, Agent, or Firm* — William Gray Mitchell

(57) ABSTRACT

A method for determining a remaining filling or draining time of a container comprising the steps: determining a current fill level, calculating the expected remaining filling or draining time from the determined fill level and a rate of change, and issuing the expected remaining filling or draining time.

4 Claims, 1 Drawing Sheet

(56) References Cited

U.S. PATENT DOCUMENTS

2016/0298996 A1* 10/2016 Koeroghlian ......... G01F 23/268

FOREIGN PATENT DOCUMENTS

DE     10 2016 112 692 A1     10/2017
EP           1072968 A2     1/2001

OTHER PUBLICATIONS

EPO search report for related application 18 153623.6, dated Aug. 30, 2018.
EPO office action for related application 18 153623.6, dated Mar. 17, 2020.

* cited by examiner

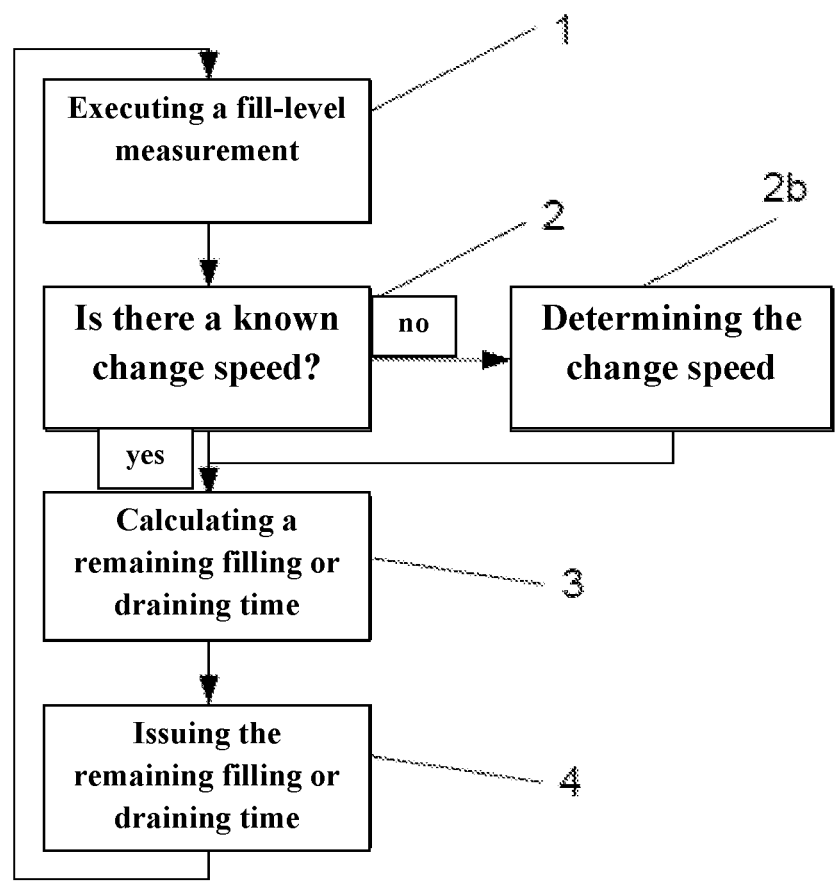

METHOD FOR DETERMINING AND DISPLAYING REMAINING FILLING OR DRAINING TIME

CROSS REFERENCE TO RELATED APPLICATIONS

This patent application claims priority to European Patent Application 18153623.6, filed on Jan. 26, 2018.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to a method for determining and displaying remaining filling or draining time.

BACKGROUND OF THE INVENTION

Prior art teaches methods for filling bags with bulk goods, which are inserted into the package from a first quantity in a coarse flow and a second quantity in a fine flow, in order to yield the fill weight, with the weight or the volume of the first quantity being determined outside the package by a first measurement and the package being filled with said quantity, the package then being filled with the second quantity, with said quantity being subjected to weighing and the weight and/or the point of time the filling process starts and/or the speed of the filling process of the second quantity being adjusted with the use of the results of the first measurement or the measurements of the previous fill cycles. Such a method is disclosed, for example, in DE 19 855 377 A1.

In this method it is considered disadvantageous that it cannot be applied for large containers, for example silos, storage tanks or storage bunkers.

The determination and display of the time until a container is completely filled or drained can be advantageous in many situations and thus it is also requested for types of containers other than bags and other fill goods than bulk goods. A determination of the remaining filling or draining time is particularly advantageous for large, closed containers when a full or empty container is required for additional work. If a respectively remaining filling or draining time is known, for example maintenance or operating personnel can prepare better work plans and the time can be determined when work can be continued or started afterwards on completely filled or empty containers or when the draining or filling process has to be started, if the work shall start at a certain point of time.

BRIEF SUMMARY OF THE INVENTION

In a preferred embodiment, a method for determining a remaining filling or draining time of a container with the steps
Determining a current fill level
Calculating the expected remaining filling or draining time from the determined fill level and a rate of change
Issuing the expected remaining filling or draining time.
In another preferred embodiment, the method as described herein, characterized in that the rate of change can be predetermined by the user.
In another preferred embodiment, the method as described herein, characterized in that a determination of the rate of change occurs.
In another preferred embodiment, the method as described herein, characterized in that the determination of the rate of change occurs by extrapolation of at least two most recently determined fill level measurements.
In another preferred embodiment, the method as described herein, characterized in that the determination of the rate of change occurs by recalling saved fill level measurements from the value table.
In another preferred embodiment, the method as described herein, characterized in that the value table includes fill level measurements or values deducted from a previous filling or draining process.
In another preferred embodiment, the method as described herein, characterized in that in addition to the remaining filling or draining time, also a variance of the issued value is calculated and displayed.

BRIEF DESCRIPTION OF THE DRAWINGS

FIG. 1 is a flow chart evidencing an exemplary embodiment of a method according to the present invention.

DETAILED DESCRIPTION OF THE INVENTION

The invention is a method according to the invention for determining an expected remaining filling or draining time of a container shows particularly the following steps:
determining a current fill level
calculating the expected remaining filling or draining time depending on the determined fill level and a rate of change, and
issuing the expected remaining filling or draining time.
By the method according to the invention it is possible, regardless of the size of the container, to issue an expected remaining or required filling or draining time in order to allow the operating or maintenance personnel better work planning. The issuance of the expected filling or draining time occurs here always based on the current rate of change, the current fill level, and perhaps in consideration of previous filling or draining processes.
In the present method the rate of change can be predetermined by the user, or determined based on measurements. Depending on the rate of change, thus the speed with which the container is filled or drained, being constant or variable, it can be predetermined in a fixed fashion or respectively determined for each individual given case.
The rate of change can be determined directly when using a frequency-modulated continuous-wave Doppler radar (FMCW-Doppler radar) or can occur for example by extrapolation of at least two, preferably three or five most recently determined fill level values. This is possible when a constant rate of change can be assumed for the respective filling or draining process.

If the rate of change is variable, this can occur by recalling saved fill level measurements from a value table, for example from a filling or draining process saved when installing the field device or from a most recently performed measurement. This way, even variations of the rate of change can be considered via the filling or draining process.

For example, for determining the rate of change, altered over the filling or draining process, here an interpolation of the change of the fill level can occur and from the temporal deduction of the change of fill level the change of speed can be determined.

The value table may include here fill level measurements or values deducted therefrom based on a previous filling or draining process.

In addition to the remaining filling and draining time, also a variance of the value issued can be calculated and displayed. Since the calculated filling or draining time not always represents a precisely calculated value but the parameter used for the calculation may be perhaps subject to certain fluctuations, it may be useful for the effects upon the remaining filling or draining time to be displayed, as well.

The method is particularly simple, when the current rate of change can be determined and is constant, for example when the rate of change is constant and has been entered by the customer.

Alternatively, the rate of change can be determined based on saved measurement trends. This way, a more precise calculation of the remaining filling or draining time can occur, particularly when the rate of change is not constant.

The rate of change can for example be saved at various points of previous filling/draining processes (e.g. at the points of a stated linearization table). Thus, a more precise calculation can occur when the rate of change is not constant.

In the following, the present invention is explained in greater detail based on an exemplary embodiment.

DETAILED DESCRIPTION OF THE FIGURES

FIG. 1 shows a flow chart of a method for determining and displaying a remaining filling or draining time according to the present invention, wherein the numbers appearing indicate the sequencing of steps.

In a first step a fill level measurement is performed, in order to determine the currently given fill level in a container. If the fill level is known, it is checked in a second step if a rate of change is known, i.e. a speed by which the fill level changes due to a filling or draining process.

If the rate of change is known, in a third step the remaining filling or draining time can be calculated and displayed in a fourth step. The issuance can occur for example via an optic display of the remaining filling or draining time. The rate of change may be known for example from a fixed specification by a user or from a previous filling or draining process.

If the rate of change is not known, it must be determined. This can occur for example by a temporal deduction of a current measurement development based on previous fill level measurements.

With the current fill level and the rate of change then the remaining filling or draining time can be calculated and issued, for example via an optic display and/or the transmission to a superordinate unit, for example a control panel.

In order to further improve the precision of the calculation or to allow issuing the respectively current value for the remaining filing or draining period, the process described here can be repeated cyclically.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A method for determining a remaining filling or draining time of a container, comprising the following steps:
    1. determining a current fill level,
    2. calculating an expected remaining filling or draining time from the determined fill level and a rate of change, wherein the rate of change is determined by a FMCW-Doppler radar using a single sensor and a single control signal, and
    3. issuing the expected remaining filling or draining time value, and in addition to the remaining filling or draining time value, also calculating a variance of the issued time value, wherein the determination of the rate of change is accomplished by recalling saved fill level measurements from the value table, the value table includes fill level measurements or values deducted from a previous filling or draining process and the rate of change is determined by an interpolation of the change of the fill level and from the temporal deduction said interpolation of the change of the fill level.

2. The method of claim 1, wherein the rate of change can be predetermined by the user.

3. The method of claim 1, wherein a determination of the rate of change occurs.

4. The method of claim 3, wherein the determination of the rate of change occurs by extrapolation of at least two most recently determined fill level measurements.

* * * * *